United States Patent [19]
Takagi et al.

[11] Patent Number: 5,566,350
[45] Date of Patent: Oct. 15, 1996

[54] INFORMATION DEVICE FOR PROVIDING FAST DATA TRANSFER WITH MINIMUM OVERHEAD

[75] Inventors: Yuji Takagi, Hirakata; Isao Satoh, Neyagawa; Yoshihisa Fukushima, Osaka; Yasushi Azumatani, Neyagawa; Hiroshi Hamasaka, Nishinomiya, all of Japan

[73] Assignee: Matsushita Electric Industrial Co., Ltd., Osaka, Japan

[21] Appl. No.: 400,284

[22] Filed: Mar. 3, 1995

Related U.S. Application Data

[63] Continuation of Ser. No. 898,795, Jun. 15, 1992, abandoned.

[30] Foreign Application Priority Data

Jun. 14, 1991 [JP] Japan ................................ 3-142927

[51] Int. Cl.⁶ .................................................. G06F 13/38
[52] U.S. Cl. ............................................ 395/842; 395/846
[58] Field of Search ................................ 395/827, 840, 395/841, 842, 847, 846, 412

[56] References Cited

U.S. PATENT DOCUMENTS

| | | | |
|---|---|---|---|
| 4,193,127 | 3/1980 | Gersbach | 365/189.04 |
| 4,309,755 | 1/1982 | Lanty | 395/841 |
| 4,368,461 | 1/1983 | Komatsu et al. | 345/186 |
| 4,455,620 | 6/1984 | Watanabe et al. | 395/847 |
| 4,599,708 | 7/1986 | Schuster | 365/174 |
| 4,945,472 | 7/1990 | Sakamura et al. | 395/775 |
| 5,276,845 | 1/1994 | Takayama | 395/847 |
| 5,414,866 | 5/1995 | Ohmae | 395/800 |
| 5,426,737 | 6/1995 | Jacobs | 395/847 |

FOREIGN PATENT DOCUMENTS

| | | |
|---|---|---|
| 1-031253 | 5/1989 | Japan . |
| 3-204753 | 12/1991 | Japan . |

OTHER PUBLICATIONS

Uffenbeck, John, "Microcomputers and Microprocessors: The 8080, 8085, and Z-80 Programming, Interfacing and Troubleshooting", 1985, Sec. 7.5 pp. 332–346.
Sayers et al. "Principles of Microprocessors". 1991. pp. 177–182.

Primary Examiner—William M. Treat
Assistant Examiner—Viet Vu
Attorney, Agent, or Firm—Ratner & Prestia

[57] ABSTRACT

An information device which ensures fast data transfer between a RAM and an I/O channel, between an I/O channel and another I/O channel, or between a RAM and another RAM: comprises address decoder circuit which allows the CPU to gain simultaneous access to both the RAM and the I/O channel when the CPU accesses a data transfer area mapped for data transfer, and an inverter which assures that both the RAM and the I/O channel operate in a mutually opposite manner, either in one mode in which the RAM works in a read operation with the I/O channel in a write operation or vice versa in response to the access request of read/write from the CPU. By assuring that both the RAM and the I/O channel operate in a mutually opposite manner, in response to an access from the CPU, data transfer between the RAM and the I/O channel is completed in a single access from the CPU; thus, fast data transfer is achieved.

14 Claims, 8 Drawing Sheets

INFORMATION DEVICE FOR PROVIDING FAST DATA TRANSFER WITH MINIMUM OVERHEAD

This application is a continuation of application Ser. No. 07/898,795 filed Jun. 15, 1992, now abandoned.

BACKGROUND OF THE INVENTION

1. Field of the Invention

The present invention relates to an information device such as a computer or peripheral devices of a computer, and in particular to data transfer operations between CPU, RAM, and I/O channels.

2. Description of the Prior Art

An information device such as a computer or peripheral devices of a computer usually comprises a CPU, a RAM, and an I/O channel. The information device typically handles data in the following manner: data is retrieved via the I/O channel from an external memory device such as a magnetic disk device and then transferred to the RAM; the data stored on the RAM are then processed by means of the CPU; and the processed data are then transferred back to the external memory device via the I/O channel. Occasionally a plurality of RAMs and I/O channels are employed in the information device. In some cases, data transfer is required between one I/O channel and another I/O channel or between one RAM and another RAM.

To transfer data between one RAM and one I/O channel, between one I/O channel and another I/O channel, or between one RAM and another RAM in the information the CPU performs a two-step operation: (1) reading data from the I/O channel in the first step, and then (2) writing the read data onto the RAM. Alternatively, a dedicated DMA controller for data transfer is employed; the control of data bus may be taken over by the DMA controller from the CPU, and the data transfer is thus performed by the DMA controller.

In the conventional information device, data transfer, for example, from the RAM to the I/O channel takes two steps: the CPU reads data from the RAM and writes the read data onto the I/O channel. Similarly, data transfer in the opposite direction, i.e., from the I/O channel to the RAM, takes two steps. Therefore, there has been a problem that, when fast data transfer is required, data transfer rate is not high enough. When a dedicated DMA controller is employed, a sufficiently high transfer rate is not achieved because of overhead involved in the takeover operation of the data bus control to the DMA controller from the CPU.

Similarly, there has been a problem that, when in a data transfer operation between one I/O channel and another I/O channel or between one RAM and another RAM, sufficiently high data transfer rate cannot be achieved.

SUMMARY OF THE INVENTION

With the view of solving the above-described disadvantages, it is an essential object of the present invention to provide an information device which ensures fast data transfer between a RAM and an I/O channel, between an I/O channel and another I/O channel, and between a RAM and another RAM.

To achieve the above object, an information device according to the present invention comprises: a memory bus for connecting a RAM to an I/O channel; address decoder means which maps a data transfer address area for transferring data via the memory bus between the RAM and the I/O channel and which accesses simultaneously both the RAM and the I/O channel when a CPU accesses the data transfer address area; read/write reverse means which assures that both the RAM and the I/O channel operate complementarily, either in one mode in which the RAM works in a read operation with the I/O channel working in a write operation or in the other mode in which the RAM works in a write operation with the I/O channel working in a read operation, in response to the access request of read/write from the CPU; and bus control means for decoupling the memory bus from the data bus of the CPU.

Furthermore, an information device according to the present invention comprises: a memory bus for connecting a first I/O channel to a second I/O channel; address decoder means which maps data transfer address area for transferring data via the memory bus between the first I/O channel and the second I/O channel and which accesses simultaneously both the first I/O channel and the second I/O channel when a CPU accesses the data transfer address area; read/write reverse means which assures that both the first I/O channel and the second I/O channel operate in a mutually opposite manner, either in one mode in which the first I/O channel works in a read operation with the second I/O channel working in a write operation or in the other mode in which the first I/O channel works in a write operation with the second I/O channel working in a read operation, in response to the access request of read/write from the CPU; and bus control means for decoupling the memory bus from the data bus of the CPU.

Furthermore, another information device according to the present invention comprises: a memory bus for connecting a first RAM to a second RAM; address decoder means which maps data transfer address area for transferring data via the memory bus between the first RAM and the second RAM and which accesses simultaneously both the first RAM and the second RAM when the CPU accesses the data transfer address area; read/write reverse means which assures that both the first RAM and the second RAM operate in a mutually opposite manner, either in one mode in which the first RAM works in a read operation with the second RAM working in a write operation or in the other mode in which the first RAM works in a write operation with the second RAM working in a read operation, in response to the access request of read/write from the CPU; and bus control means for decoupling the memory bus from the data bus of the CPU.

According to a feature of the present invention, for example, when the CPU accesses the RAM for read, the CPU simultaneously accesses the I/O channel for write, whereby the data read from the RAM is written to the I/O channel. Thus, a single access of the CPU allows data transfer between the RAM and the I/O channel to be completed, thereby achieving fast data transfer.

According to another feature of the present invention, for example, when the CPU accesses the first I/O channel for read, the CPU simultaneously accesses the second I/O channel for write, whereby the data read from the first I/O is written to the second I/O channel. Thus, a single access of the CPU allows data transfer between the first I/O channel and the second I/O channel to be completed, thereby achieving fast data transfer.

According to further another feature of the present invention, for example, when the CPU accesses the first RAM for read, the CPU simultaneously accesses the second RAM for write, whereby the data read from the first RAM is written to the second RAM. Thus, a single access of the CPU allows data transfer between the first RAM and the second RAM to be completed, thereby achieving fast data transfer.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Figure 1:
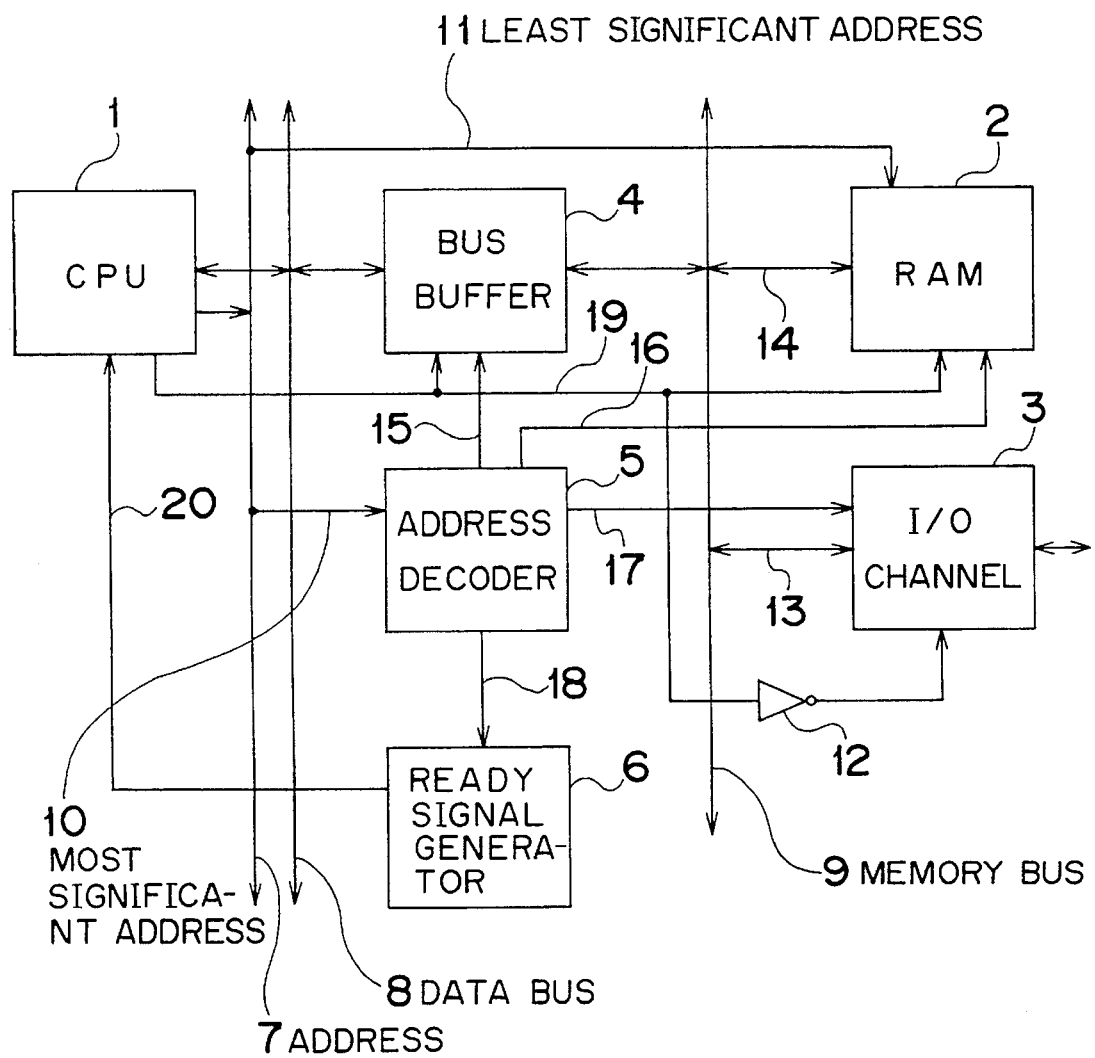
FIG. 1 is a block diagram showing a first embodiment of an information device according to the present invention.

FIG. 1 shows a construction of a first embodiment of an information device according to the present invention. Indicated in FIG. 1 are a CPU 1 made of a microprocessor or the like, a RAM 2 composed of a semiconductor memory or the like, an I/O channel 3 which receives data from or transmits data to an external device, a bus buffer 4 which performs coupling or decoupling between the data bus 8 of the CPU 1 and a memory bus 9, and an address decoder circuit 5 which decodes a most significant address 10 of an address 7 output by the CPU 1. The information device further includes a READY signal generator 6 composed of a counter and the like for outputting an XREADY signal 20 at predetermined weight to notify the CPU 1 of the termination of a memory cycle, and further includes an inverter 12.

Figure 2:
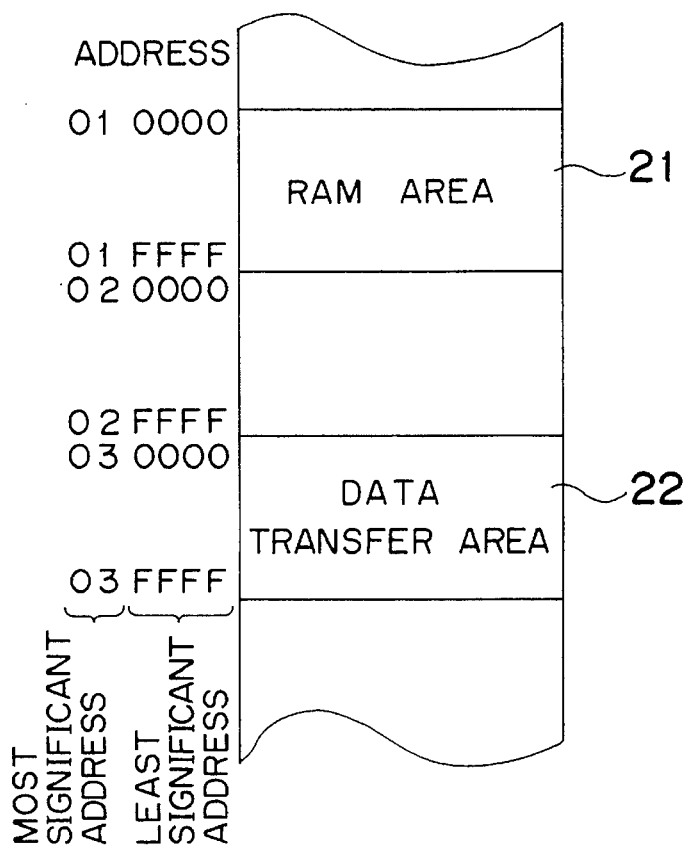
FIG. 2 is an address map of the first embodiment of the information device.

FIG. 2 shows an address map used in the information device of FIG. 1. In FIG. 2, designated by a reference numeral 21 is a RAM area assigned to the RAM 2, a reference numeral 22 is a data transfer area which accesses, for data transfer, simultaneously both the RAM 2 and the I/O channel 3. When the CPU 1 specifies the RAM area 21 of 010000 through 01FFFF in the address 7, only the RAM 2 is selected; when the CPU 1 specifies the data transfer area 22 of 030000 through 03FFFF in the address 7, both the RAM 2 and the I/O channel 3 are selected.

Figure 3:
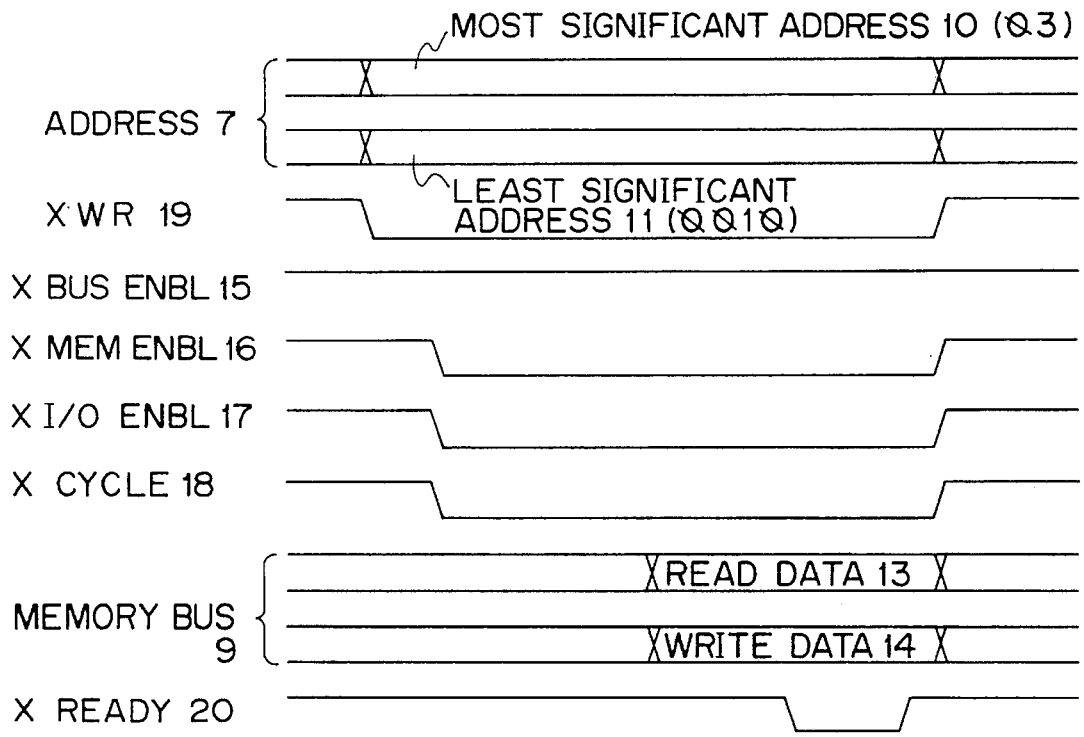
FIG. 3 is a time chart illustrating the operation of the first embodiment.

With reference to the time chart of FIG. 3, the operation of the information device of the first embodiment according to the present invention is described below.

The explanation will be made below assuming that data transfer is taking place from the I/O channel 3 to the RAM 2. The CPU 1 specifies an access for write to the data transfer area 22. If, for example, 030010 is specified in the address 7, 03 as the most significant address 10 is sent to the address decoder circuit 5. The address decoder circuit 5 decodes the most significant address 10, enabling both an enable signal XMEMENBL 16 for the RAM 2 and an enable signal XI/OENBL 17 for the I/O channel 3. The address decoder circuit 5 further outputs XCYCLE 18 to the READY signal generator 6 to indicate that a memory cycle is active. The address decoder circuit 5 disables an enable signal XBUSENBL 15 for the bus buffer 4. The signals of XBUSENBL 15, XMEMENBL 16, XI/OENBL 17 and XCYCLE 18 are herein all negative logic signals.

The CPU 1 transmits a negative logic write signal XWR 19 to the RAM 2, commanding the RAM 2 to carry out a write operation. The XWR 19 is further inverted through the inverter 12 and transmitted to the I/O channel 3, commanding the I/O channel 3 to carry out a read operation.

When the XI/OENBL 17 is enabled, the I/O channel 3 begins a data reading operation, and sends the read data 13 to the memory bus 9. When the XMEMENBL 16 is enabled, the RAM 2 begins a data write operation. The write data 14 transferred via the memory bus 9 is stored onto an area 0010 specified by the least significant address 11. The read data 13 read out from the I/O channel 3 and transferred via the memory bus 9 to the RAM 2 is used as write data 14 to be written onto the RAM 2; thus, the read data 13 is identical to the write data 14. Namely, the data transfer operation of transferring data from the I/O channel 3 to the RAM 2 is completed.

Since the XBUSENBL 15 is disabled, the bus buffer 4 decouples the data bus 8 of the CPU 1 from the memory bus 9 so that the data to the RAM 2 from the I/O channel 3 may not collide against the data from the CPU 1. Namely, the data output from the CPU 1 is ignored. When the XCYCLE 18 is enabled, the READY signal generator 6 counts a specified clock and transmits the XREADY signal 20 to the CPU 1 to thereby notify of the termination of the memory cycle.

Figure 4:
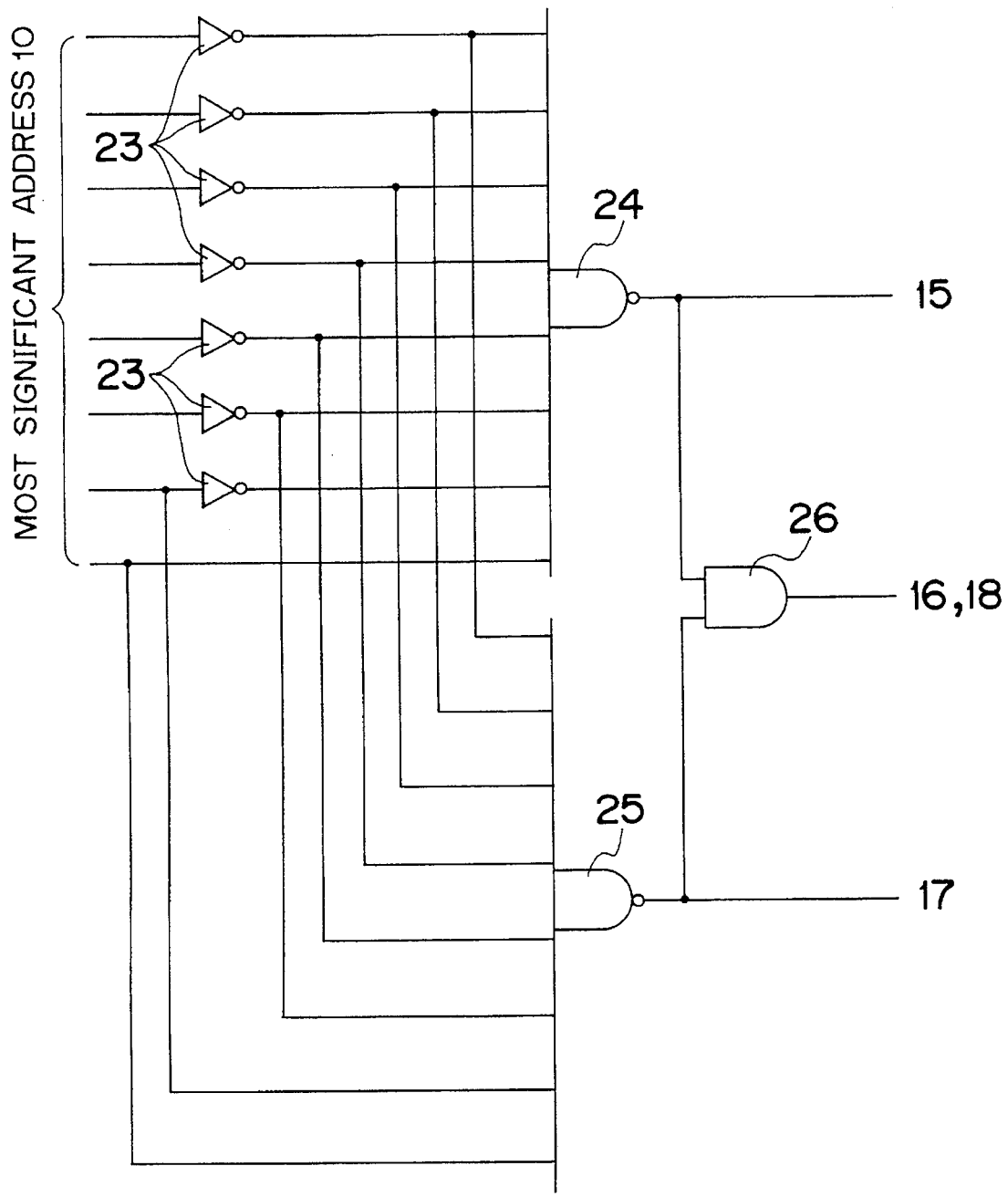
FIG. 4 is a detailed schematic diagram showing an address decoder circuit of the first embodiment.

FIG. 4 shows a detailed construction of the address decoder circuit 5. In FIG. 4, designated by a reference numeral 23 is an inverter, 24 and 25 are NAND gates, and 26 is an AND gate. The most significant address 10 is fed to the address decoder circuit 5 constructed as above. The output of the NAND gate 24 is driven low when the most significant address 10 is 01, namely, when the RAM area 21 is specified. The output of the NAND gate 25 is driven low when the most significant address 10 is 03, namely, when the data transfer area 22 is specified. The output of the AND gate 26 is driven low when the most significant address 10 is either 01 or 03, namely, when the RAM area 21 or the data transfer area 22 is specified. The NAND gate 24 gives its output designated as XBUSENBL 15, the NAND gate 25 gives its output designated as XI/OENBL 17, and the AND gate 26 gives its output designated as XMEMENBL 16 or XCYCLE 18.

According to the information device of the first embodiment of the present invention, as described above, data transfer from the I/O channel 3 to the RAM 2 is completed in a single memory access by making the CPU 1 access the data transfer area 22 for a write operation. Moreover, data may be transferred to any location in the RAM area 21 by specifying the least significant address 11.

When data transfer takes place from the RAM 2 to the I/O channel 3, the data transfer may be completed, in a similar manner as described above, in a single memory access by making the CPU 1 access the data transfer area 22 for read.

Moreover, data in any location in the RAM area 21 may be transferred to the I/O channel 3 by specifying the least significant address 11. For gaining access to data of the RAM 2, the CPU 1 may access the RAM area 21 for read/write operation.

In the above description, the control of timing in response to a clock signal is omitted.

According to the first embodiment of the present invention, by mapping the data transfer area which is capable of simultaneously accessing both the RAM 2 and the I/O channel 3, it becomes possible to complete data transfer between the RAM 2 and the I/O channel 3 with a single access from the CPU 1.

Figure 5:
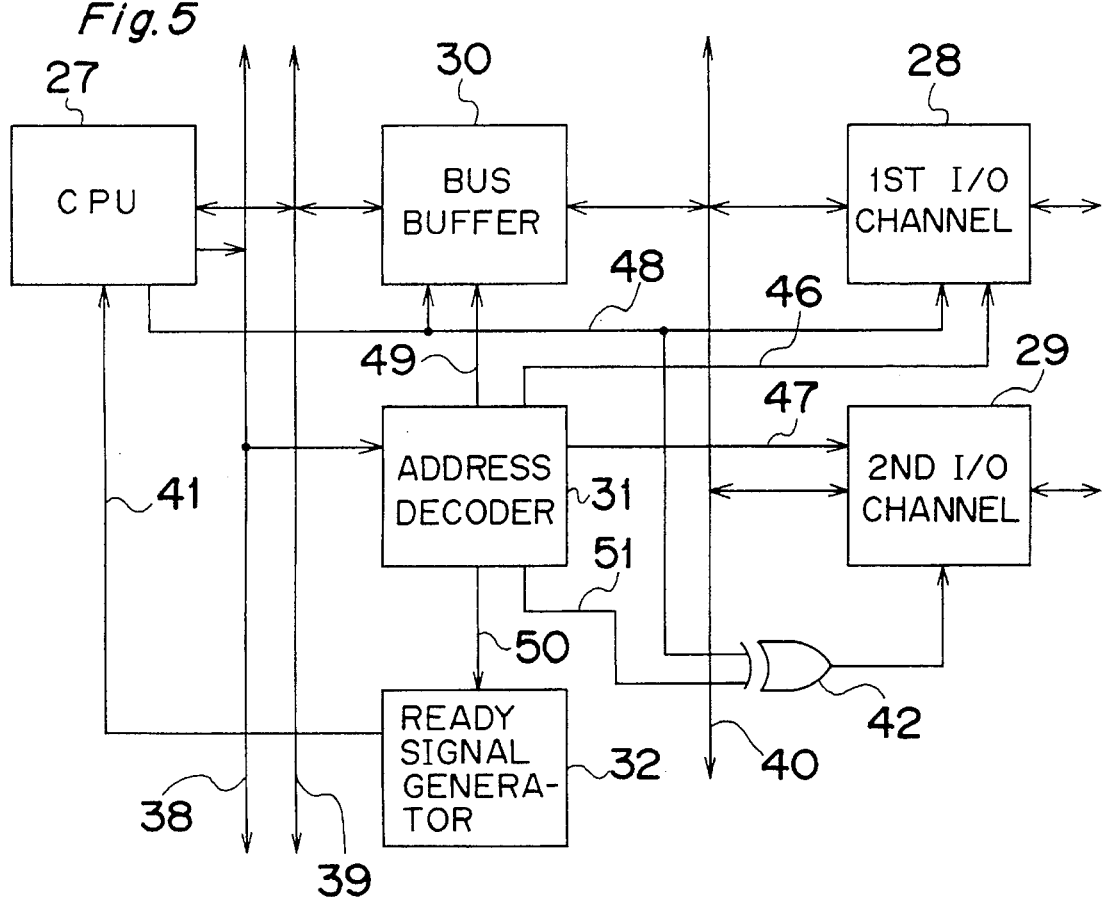
FIG. 5 is a block diagram showing a second embodiment of the information device according to the present invention.

FIG. 5 shows a construction of an information device according to the second embodiment of the present invention. In FIG. 5, designated by a reference numeral 27 is a CPU which is composed of a microprocessor or the like, 28 is a first I/O channel which receives data from or transmits data to external devices, 29 is a second I/O channel which receives data from or transmits data to an external device, 30 is a bus buffer for coupling or decoupling between a data bus 39 of the CPU 27 and a memory bus 40, 31 is an address decoder circuit for decoding address 38 taken out from the CPU 27, 32 is a READY signal generator which is composed of a counter and the like for generating an XREADY signal 41 at predetermined weight to notify the CPU 27 of the termination of a memory cycle, and 42 is an exclusive OR gate.

Figure 6:
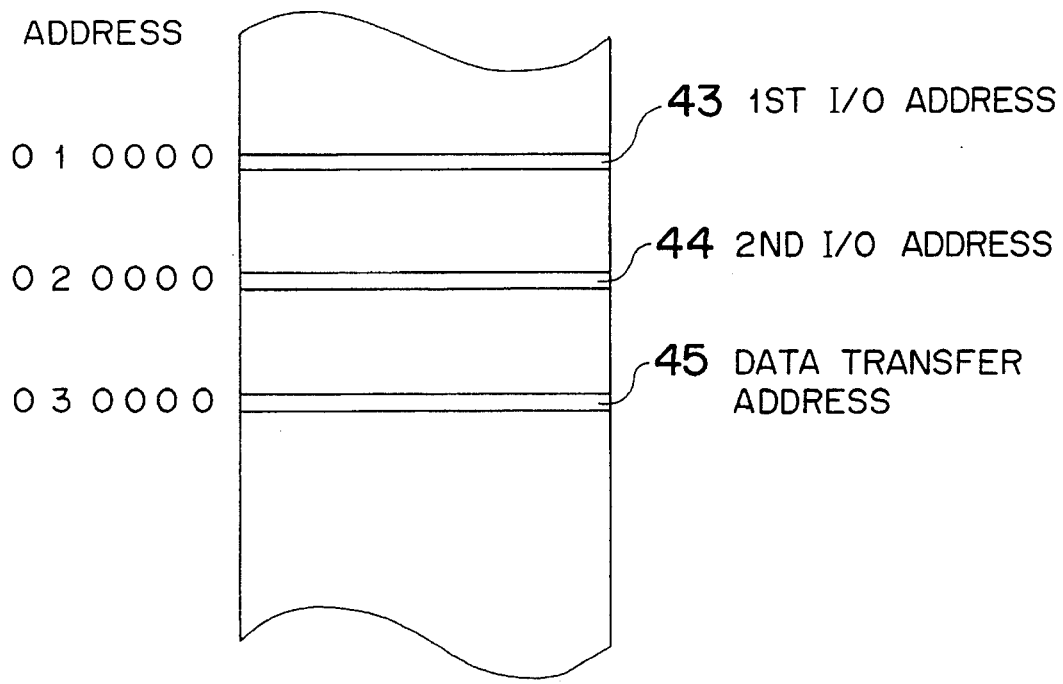
FIG. 6 is an address map of the second embodiment of the information device.

FIG. 6 shows an address map used in the information device of FIG. 5. In FIG. 6, designated by a reference numeral 43 is a first I/O address assigned to the first I/O channel 28, 44 is a second I/O address assigned to the second I/O channel 29, and 45 is a data transfer address which accesses, for data transfer, simultaneously both the first I/O channel 28 and the second I/O channel 29. When the CPU 27 specifies the first I/O address 43 of 010000 in the address 38, only the first I/O channel 28 is selected; when the CPU 27 specifies the second I/O address 44 of 020000 in the address 38, only the second I/O channel 29 is selected; and when the CPU 27 specifies the data transfer address 45 of 030000 in the address 38, both the first I/O channel 28 and the second I/O channel 29 are selected.

The operation of the information device of the second embodiment according to the present invention is described below.

The explanation will be made assuming that data transfer is taking place from the second I/O channel 29 to the first I/O channel 28. The CPU 27 specifies an access for write to the data transfer address 44, namely, 030000 in the address 38 is sent to the address decoder circuit 31. The address decoder circuit 31 decodes the address 38, enabling both an enable signal XI/O1ENBL 46 for the first I/O channel 28 and an enable signal XI/O2ENBL 47 for the second I/O channel 29. The address decoder circuit 31 further transmits an XCYCLE signal 50 to the READY signal generator 32 to indicate that a memory cycle is active. The address decoder circuit 31 disables an enable signal XBUSENBL 49 for the bus buffer 30. XBUSENBL 49, XI/O1ENBL 46, XI/O2ENBL 47 and XCYCLE 50 are herein all negative logic signals. A positive logic signal DTTR 51 from the address decoder circuit 31 is driven high to indicate that the data transfer address 45 is selected.

The CPU 27 transmits a negative logic signal XWR 48 to the first I/O channel 28, thereby commanding the first I/O channel 28 to carry out a write operation. The XWR 48 is further fed from the CPU 27 to the exclusive OR gate 42.

Since the DTTR 51 remains high, the XWR 48 is inverted, and thus, a read operation is commanded to the second I/O channel 29.

When the XI/O2ENBL 47 is enabled, the second I/O channel 29 begins reading data and sends the read data to the memory bus 40. When the XI/O1ENBL 46 is enabled, the first I/O channel 28 begins data write operation. Herein, the read data read out of the second I/O channel 29 is transferred via the memory bus 40 to be used as the write data for the first I/O channel 28; thus, the data transfer operation is completed from the second I/O channel 29 to the first I/O channel 28.

Since the XBUSENBL 49 is disabled, the bus buffer 30 decouples the data bus 39 for the CPU 27 from the memory bus 40 so that the transferred data to the first I/O channel 28 from the second I/O channel 29 may not collide against the data from the CPU 27, in other words, the data output from the CPU 27 is ignored. When the XCYCLE 50 is enabled, the READY signal generator 32 counts the specified clock and transmits the XREADY signal 41 to the CPU 27 to notify of the termination of the memory cycle.

Figure 7:
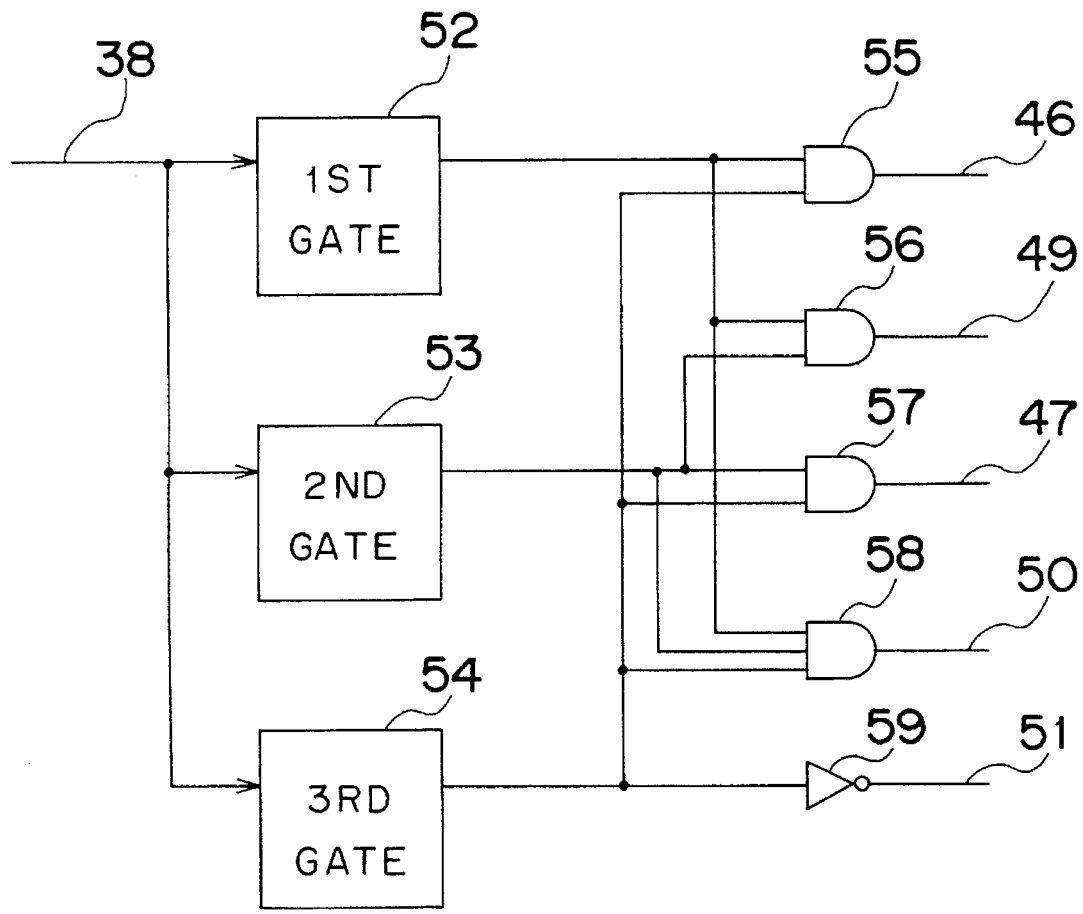
FIG. 7 is a detailed schematic diagram showing an address decoder circuit of the second embodiment.

FIG. 7 shows a detailed construction of the address decoder circuit 31. In FIG. 7, designated by a reference numeral 52 is a first gate, 53 is a second gate, 54 is third gate, 55 through 58 are AND gates, and 59 is an inverter.

The address decoder circuit 31 constructed as above receives the address 38 from the CPU 27. The output of the first gate 52 is driven low when the address 38 is 010000, namely, when the first I/O address 43 is specified. The output of the second gate 53 is driven low when the address 38 is 020000, namely, when the second I/O address 44 is specified. The output of the third gate 54 is driven low, when the address 38 is 030000, namely, when the data transfer address 45 is specified. These outputs gates 52 through 54 are fed to each of the AND gates 55 through 58, and to the inverter 59.

When the first I/O address 43 or the data transfer address 45 is specified by the address 38, the output of the AND gate 55 is driven low, which is used as the signal designated by XI/O1ENBL 46 to be fed to the first I/O channel 28.

When the first I/O address 43 or the second I/O address 44 is specified by the address 38, the output of the AND gate 56 is driven low, which is used as the signal designated by XBUSENBL 49 to be fed to the bus buffer 30.

When the second I/O address 44 or the data transfer address 45 is specified by the address 38, the output of the AND gate 57 is driven low, which is used as the output designated by XI/O2ENBL 47 to be fed to the second I/O channel 29.

When the first I/O address 43, the second I/O address 44 or the data transfer address 45 is specified by the address 38, the output of the AND gate 58 is driven low, which is used as the output designated by XCYCLE 50 to be fed to the READY generator 32.

When the data transfer address 45 is specified by the address 38, the output of the inverter 59 is driven high to be used as the output designated by DTTR 51 which is fed to the exclusive OR gate 42.

According to the information device of the second embodiment of the present invention, by accessing the data transfer address 45 for a write operation with the CPU 27, the data transfer from the second I/O channel 29 to the first I/O channel 28 is completed in a single access.

On the other hand, when data transfer takes place from the first I/O channel 28 to the second I/O channel 29, by accessing the data transfer address 45 for a read operation with the CPU 27, a single access also completes the data transfer.

For gaining separately access to the first I/O channel 28 or the second I/O channel 29, the CPU 27 accesses the first I/O address 43 or the second I/O address 44, thereby carrying out the read/write operations.

In the above description, the control of timing in response to a clock signal is omitted.

According to the second embodiment of the present invention, as described above, data transfer between the first I/O channel 28 and the second I/O channel 29 is completed in a single access from the CPU 27, by mapping the data transfer address 45 which is capable of simultaneously accessing both the first I/O channel 28 and the second I/O channel 29.

Figure 8:
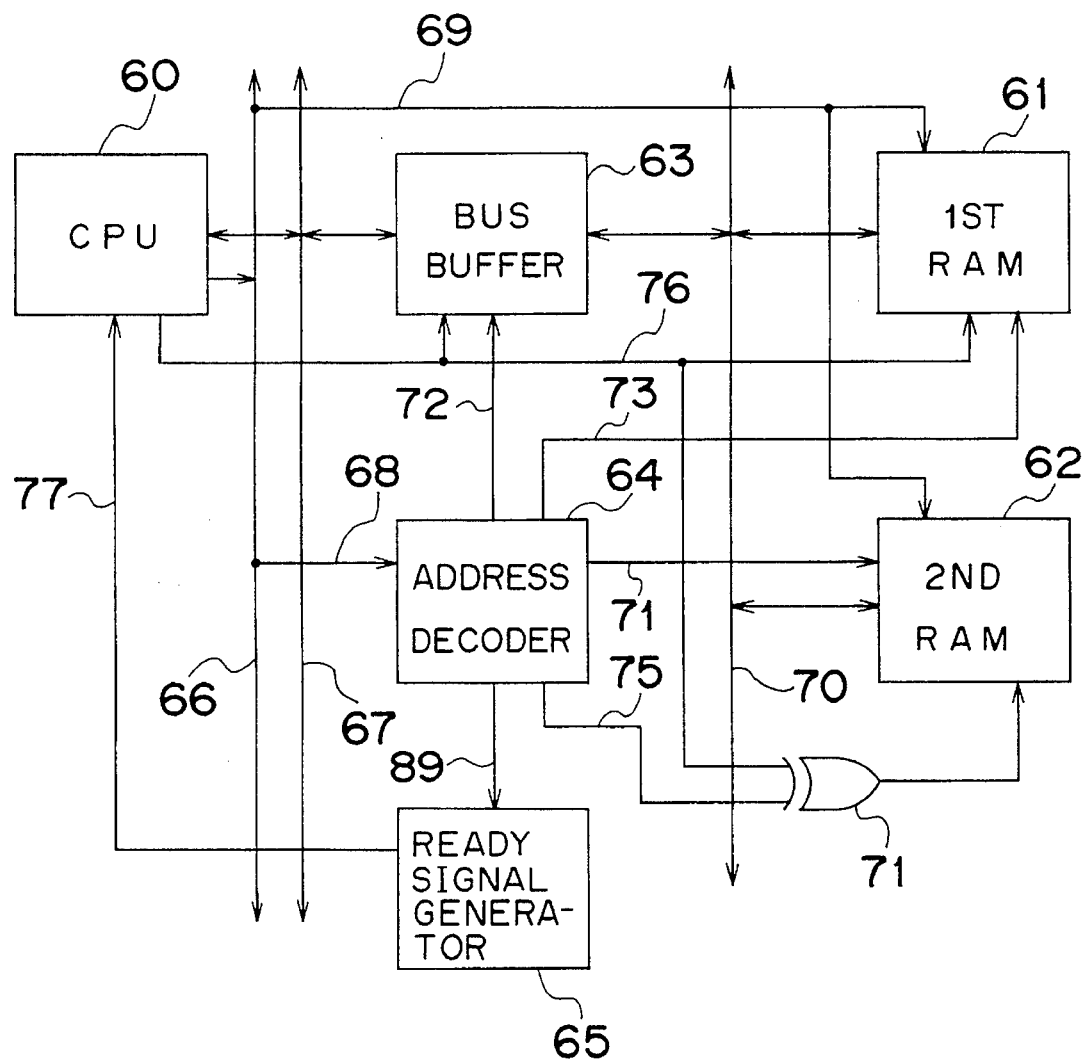
FIG. 8 is a block diagram showing a third embodiment of the information device of the present invention.

FIG. 8 shows a construction of the information device according to the third embodiment of the present invention. In FIG. 8, designated by a reference numeral 60 is a CPU 60 composed of a microprocessor or the like, 61 is a first RAM composed of a semiconductor memory or the like, 62 is a second RAM which receives data from or transmits data to an external device, 63 is a bus buffer for coupling or decoupling between the data bus 67 of the CPU 60 and a memory bus 70, 64 is an address decoder circuit which decodes the most significant address 68 of address 66 generated by the CPU 60, 65 is a READY signal generator composed of a counter and the like for outputting XREADY signal 77 at predetermined weight to notify the CPU 60 of the termination of a memory cycle, and 71 is an exclusive OR gate.

Figure 9:
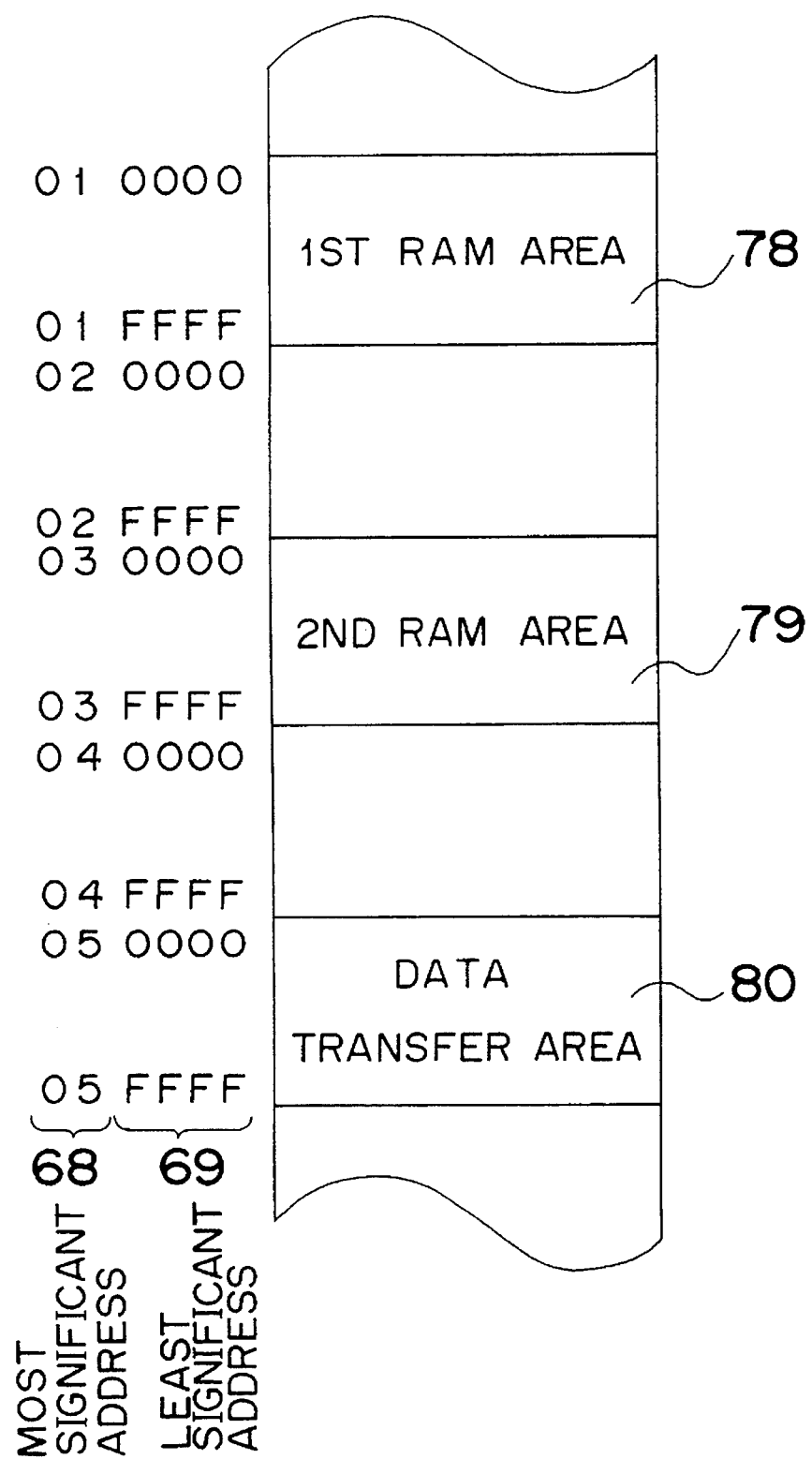
FIG. 9 is an address map of the third embodiment of the information device.

FIG. 9 shows the address map of the information device of FIG. 8. In FIG. 9, designated by a reference numeral 78 is a first RAM area assigned to the first RAM 61, 79 is a second RAM area assigned to the second RAM 62, and 80 is a data transfer area which accesses, for data transfer, simultaneously both the first RAM 61 and the second RAM 62. When the CPU 60 specifies the first RAM area 78 of 010000 through 01FFFF in the address 66, only the first RAM 61 is selected; when the CPU 60 specifies the second RAM area 79 of 030000 through 03FFFF, only the second RAM 62 is selected; and when the CPU 60 specifies the data transfer area 80 of 050000 through 05FFFF in the address 7, both the first RAM 61 and the second RAM 62 are selected.

The operation of the information device according to the third embodiment of the present invention is described below.

The explanation will be made here assuming that data transfer is taking place from the second RAM 62 to the first RAM 61. The CPU 60 specifies an access for write to the data transfer area 80. For example, when it is assumed that 050010 is specified in the address 7, the most significant address 68 of 05 is sent to the address decoder circuit 64. The address decoder circuit 64 decodes the most significant address 68, enabling both an enable signal XMEM1ENBL 73 for the first RAM 61 and an enable signal XMEM2ENBL 74 for the second RAM 62. The address decoder circuit 64 further transmits XCYCLE 89 to the READY signal generator 65 to indicate that a memory cycle is active. The address decoder circuit 64 disables an enable signal XBUSENBL 72 for the bus buffer 63. The signals of XBUSENBL 72, XMEM1ENBL 73, XMEM2ENBL 74 and XCYCLE 89 are herein all negative logic signals. A positive logic signal DTTR 75 output from the address decoder circuit 64 is driven high to indicate that the data transfer area 80 is selected.

The CPU 60 transmits a negative logic signal XWR 76 to the first RAM 61, Commanding the first RAM 61 to carry out a write operation. The XWR 76 is fed to the exclusive OR gate 71. The DTTR 75 remains high, and therefore the XWR 76 is inverted, and thus, a read operation is commanded to the second RAM 62.

When the XMEM2ENBL 74 is enabled, the second RAM 62 begins reading data and sends the read data read out from the area 0010 specified by the least significant address 69 to the memory bus 70. When the XMEM1ENBL 73 is enabled, the first RAM 61 begins data write operation. The read data read out from the second RAM 62 is transferred via the memory bus 70 to be fed as the write data for the first RAM 61. The write data is stored in the area 0010 specified by the least significant address 69. That is, data in the area 0010 specified by the least significant address are transferred from the second RAM 62 to the first RAM 61.

Since the XBUSENBL 72 is disabled, the bus buffer 63 decouples the data bus 67 of the CPU 60 from the memory bus 70 so that the data to the first RAM 61 from the second RAM 62 may not collide against the data transmitted from the CPU 60. Namely, the data transmitted from the CPU 60 are ignored. When the XCYCLE 89 is enabled, the READY signal generator 65 counts the specified clock and transmits the XREADY signal 77 to the CPU 60 thereby to notify of the termination of the memory cycle.

Figure 10:
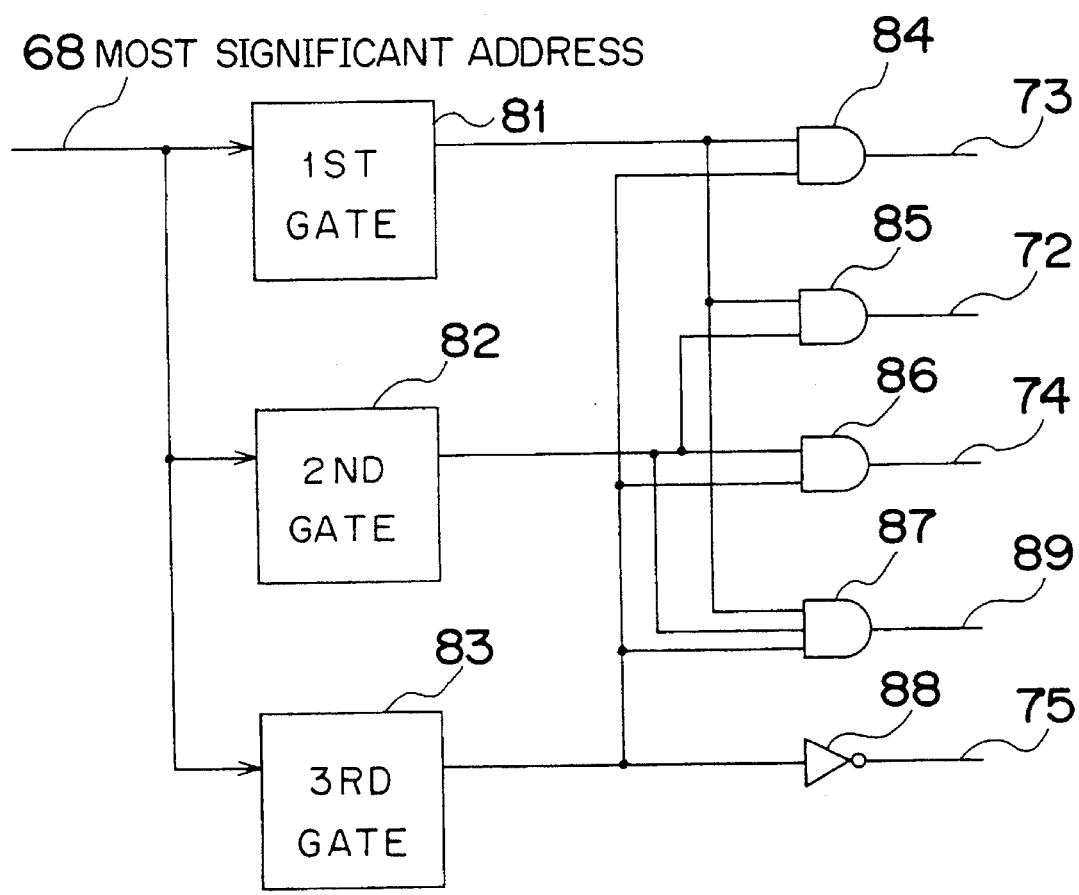
FIG. 10 is a detailed schematic diagram showing an address decoder circuit of the third embodiment.

FIG. 10 shows a detailed construction of the address decoder circuit 64. In FIG. 10, designated by a reference numeral 81 is a first gate, 82 is a second gate, 83 is a third gate, 84 through 87 are AND gates, and 88 is an inverter.

The address decoder circuit 64 receives the most significant address 68 via the address 66 from the CPU 60. The output of the first gate 81 is driven low when the most significant address 68 is 01, namely, when the first RAM area 78 is specified. The output of the second gate 82 is driven low when the most significant address 68 is 03, namely, when the second RAM area 79 is specified. The output of the third gate 83 is driven low when the most significant address 68 is 05, namely, when the data transfer address 80 is specified. These outputs of the gates 81 through 83 are fed to each of the AND gates 84 through 87, and to the inverter 88.

When the first RAM area 78 or the data transfer area 80 is specified by the most significant address 68, the output of the AND gate 84 is driven low to be used as the output designated by XMEM1ENBL 73 which is fed to the first RAM 61.

When the first RAM area 78 or the second RAM area 79 is specified by the most significant address 68, the output of the AND gate 85 is driven low to be used as the output designated by XBUSENBL 72 which is fed to the bus buffer 63.

When the second RAM area 79 or the data transfer area 80 is specified by the most significant address 68, the output of the AND gate 86 is driven low to be used as the output designated by XMEM2ENBL 74 which is fed to the second RAM 62.

When the first RAM area 78, the second RAM area 79 or the data transfer area 80 is specified by the most significant address 68, the output of the AND gate 87 is driven low to be used as the output designated by XCYCLE 89 which is fed to the READY generator 65.

When the data transfer area 80 is specified by the most significant address 68, the output of the inverter 88 is driven high to be used as the output designated by DTTR 75 which is fed to the exclusive OR gate 71.

According to the information device of the third embodiment of the present invention, by accessing the data transfer area 80 for a write operation with the CPU 60, the data transfer from the second RAM 62 to the first RAM 61 is completed in a single access.

On the other hand, when data transfer takes place from the first RAM 61 to the second RAM 62, by accessing the data transfer area 80 for a read operation with the CPU 60, a single access completes the data transfer in a similar manner as mentioned above.

For gaining separately access to the first RAM 61 or the second RAM 62, the CPU 60 accesses the first RAM area 78 or the second RAM area 79 for read/write operations.

In the above description, the control of timing in response to a clock signal is omitted.

According to the third embodiment of the present invention, as described above, data transfer between the first RAM 61 and the second RAM 62 is completed in a single access from the CPU 60 by mapping the data transfer area 80 which is capable of simultaneously accessing both the first RAM 61 and the second RAM 62.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. An information device having a RAM and an I/O channel, comprising:

a CPU coupled to an address bus and a data bus, the CPU issuing a single address on the address bus designating a data transfer area and representative of both the source and destination for a data transfer:

memory bus means, separate from the data bus, for connecting the RAM to the I/O channel;

address decoder means which, in response to the single address, provides simultaneous access to both the RAM and the I/O channel;

read/write reverse means which causes the RAM and the I/O channel to operate in a mutually opposite manner; and bus control means, responsive to the address decoder means, for decoupling the memory bus means from the data bus, wherein data transfer is completed between the RAM and the I/O channel in a single access from the CPU.

2. The information device according to claim 1, wherein said address decoder means comprises a RAM area, which gains access only to the RAM by the CPU, in an area of which predetermined most significant bit is different from that of the data transfer address area.

3. An information device having a first I/O channel and a second I/O channel, comprising:

a CPU coupled to an address bus and a data bus, the CPU issuing a single address on the address bus designating a data transfer area and representative of both the source and destination for a data transfer:

memory bus means, separate from the data bus, for connecting the first I/O channel to the second I/O channel:

address decoder means which, in response to the single address, provides simultaneous access to both the first I/O channel and the second I/O channel;

read/write reverse means which causes the first I/O channel and the second I/O channel to operate in a mutually opposite manner: and bus control means, responsive to the address decoder means, for decoupling the memory bus from the data bus, wherein data transfer is completed between the first I/O channel and the second I/O channel in a single access from the CPU.

4. An information device having a first RAM and a second RAM, comprising:

a CPU coupled to an address bus and a data bus, the CPU issuing a single address on the address bus designating a data transfer area and representative of both the source and destination for a data transfer;

memory bus means, separate from the data bus, for connecting the first RAM to the second RAM:

address decoder means which, in response to the single address, provides simultaneous access to both the first RAM and the second RAM:

read/write reverse means which causes the first RAM and the second RAM to operate in a mutually opposite manner; and bus control means, responsive to the address decoder means, for decoupling the memory bus from the data bus, wherein data transfer is completed between the first RAM and the second RAM in a single access from the CPU.

5. The information device according to claim 4, wherein said address decoder means comprises both a first RAM area which gains access only to the first RAM by the CPU, and a second RAM area which gains access only to the second RAM by the CPU, in an area of which predetermined most significant bit is different from that of the data transfer address area.

6. The information device according to claim 1, wherein the address decoder means generates a control signal for controlling the bus control means.

7. The information device according to claim 3, wherein the address decoder means generates a control signal for controlling the bus control means.

8. The information device according to claim 4, wherein the address decoder means generates a control signal for controlling the bus control means.

9. The information device according to claim 1, wherein the CPU provides a read/write operation control signal directly to the RAM and I/O channel for the data transfer operation.

10. The information device according to claim 3, wherein the CPU provides a read/write operation control signal directly to the first and second I/O channels for the data transfer operation.

11. The information device according to claim 4, wherein the CPU provides a read/write operation control signal directly to the first and second RAMs for the data transfer operation.

12. The information device according to claim 1, further comprising a ready signal generator means for notifying the CPU when a data transfer cycle is complete.

13. The information device according to claim 3, further comprising a ready signal generator means for notifying the CPU when a data transfer cycle is complete.

14. The information device according to claim 4, further comprising a ready signal generator means for notifying the CPU when a data transfer cycle is complete.

* * * * *

UNITED STATES PATENT AND TRADEMARK OFFICE
CERTIFICATE OF CORRECTION

PATENT NO.    : 5,566,350
DATED         : October 15, 1996
INVENTOR(S)   : Takagi et al.

It is certified that error appears in the above-identified patent and that said Letters Patent is hereby corrected as shown below:

Column 10, line 16, after "RAM" delete the colon ":" and insert therefor a semicolon --;--.

Column 10, line 19, after "RAM" delete the colon ":" and insert therefor a semicolon --;--.

Signed and Sealed this

Seventeenth Day of March, 1998

*Attest:*

BRUCE LEHMAN

*Attesting Officer*      *Commissioner of Patents and Trademarks*